UNITED STATES PATENT OFFICE.

J. WARREN LAMB, OF WHITESTONE, NEW YORK.

IMPROVEMENT IN SOLDERING.

Specification forming part of Letters Patent No. 153,090, dated July 14, 1874; application filed July 1, 1874.

*To all whom it may concern:*

Be it known that I, J. WARREN LAMB, of Whitestone, Queens county and State of New York, have invented a certain new and useful Improvement in Soldering, of which the following is a specification:

Rosin as a flux has been long used for soldering purposes; but it has only been so used in the form of a powder, in which form it is very objectionable on many accounts. It is difficult to apply it in the proper quantity, and great care is required in order to avoid covering the work with it, and thus making a sticky, dirty job.

In the operation of roofing of houses much annoyance is occasioned by the liability of the powdered rosin to be blown away by the wind, and at times from this cause it is almost impracticable to solder. The powder is also liable to become mixed with dust and dirt, and to be injuriously affected by moisture. Such are a few of the many objections to the use of ordinary powdered rosin.

It is my object to obviate the above and other disadvantages, which I do by preparing a flux in liquid form. This is effected by dissolving rosin in a liquid in which it is soluble, the relative quantity of each being determined by the strength of flux required. It is in this feature—viz., a liquid flux composed in whole or in the main of rosin dissolved in a liquid in which it is soluble—that my invention is comprised.

For an ordinary flux—say, for instance, for roofing purposes—I dissolve twenty-four ounces of rosin in one gallon of liquid. These proportions, however, are variable, and will depend upon how strong a solution is desired. The liquid I employ is any liquid suitable for the purpose. It is desirable to use a liquid that will evaporate easily. I find alcohol is, on the whole, the best. Benzine, however, is almost as good, and is much cheaper; but in lieu of these I can use naphtha, gasoline, turpentine, kerosene, or any other liquid that will cut the rosin. I may remark here, however, that a liquid containing any material percentage of oil is hardly suitable for the nicer kinds of work, since it will not evaporate entirely, and will be apt to leave a residuum, which will detract from the appearance of the work.

The liquid flux thus produced can be applied to the parts to be soldered by any suitable means—such, for instance, as a swab or brush. It can, as will be readily perceived, be applied in just the quantity desired, neither more nor less than is necessary. The liquid evaporates on application to the soldering coppers or tongs; or it will, in like manner, evaporate by exposure to the atmosphere for a short time, leaving the rosin behind in the form of a thin coating distributed evenly over the surface to be soldered, where it will remain for an indefinite period unimpaired, and without loss of any of its flux properties. Furthermore, it is proof against any of the causes that injuriously affect the powdered rosin; and, being kept in bottles, it does not become mingled with dust or foreign substances.

Having now described my invention, and the manner in which the same is or may be carried into effect, what I claim, and desire to secure by Letters Patent, is—

As an improvement in the art of soldering, the application and use, substantially as described, of rosin solution as a soldering-flux.

In testimony whereof I have hereunto signed my name this 29th day of June, A. D. 1874.

J. WARREN LAMB.

Witnesses:
   AMMERMAN WRIGHT,
   JAMES W. HILL.